(12) United States Patent
Cao et al.

(10) Patent No.: US 10,822,258 B2
(45) Date of Patent: Nov. 3, 2020

(54) DEVICE AND METHOD FOR TREATING HARMFUL ALGAL BLOOMS USING MODIFIED CLAY

(71) Applicant: INSTITUTE OF OCEANOLOGY, CHINESE ACADEMY OF SCIENCES, Shandong (CN)

(72) Inventors: Xihua Cao, Shandong (CN); Zhiming Yu, Shandong (CN); Xiuxian Song, Shandong (CN); Yongquan Yuan, Shandong (CN); Zaixing Wu, Shandong (CN); Liyan He, Shandong (CN)

(73) Assignee: INSTITUTE OF OCEANOLOGY, CHINESE ACADEMY OF SCIENCES, Shangdong (CN)

( * ) Notice: Subject to any disclaimer, the term of this patent is extended or adjusted under 35 U.S.C. 154(b) by 0 days.

(21) Appl. No.: 16/076,920

(22) PCT Filed: May 11, 2017

(86) PCT No.: PCT/CN2017/083852
§ 371 (c)(1),
(2) Date: Aug. 9, 2018

(87) PCT Pub. No.: WO2018/107651
PCT Pub. Date: Jun. 21, 2018

(65) Prior Publication Data
US 2019/0039923 A1      Feb. 7, 2019

(30) Foreign Application Priority Data

Dec. 15, 2016  (CN) .......................... 2016 1 1163503

(51) Int. Cl.
*C02F 1/68*         (2006.01)
*C02F 1/28*         (2006.01)
(Continued)

(52) U.S. Cl.
CPC .............. *C02F 1/687* (2013.01); *C02F 1/281* (2013.01); *C02F 2103/007* (2013.01);
(Continued)

(58) Field of Classification Search
CPC .... C02F 1/281; C02F 1/687; C02F 2103/007; C02F 2103/08; C02F 2201/008; C02F 2209/42; C02F 2303/20
See application file for complete search history.

(56) References Cited

FOREIGN PATENT DOCUMENTS

| CN | 101229933 A | 7/2008 |
|----|-------------|--------|
| CN | 101445285 A | 6/2009 |

(Continued)

OTHER PUBLICATIONS

Machine translation of the description of CN 104211151 A (EPO website) (Year: 2017).*

*Primary Examiner* — Terry K Cecil
(74) *Attorney, Agent, or Firm* — Novick, Kim & Lee, PLLC; Allen Xue (57) ABSTRACT

A device for treating harmful algal blooms using modified clay includes a power system, a screw conveying storage bin storing and conveying modified clay to a mixed flow system, the mixed flow system that continuously disperses the modified clay in water which is pumped in in site and endowed an impulse so that an adjustable turbulence is formed to instantly adopt the fed powder and then make sure the slurry uniform and ripened, a high-pressure sprinkling system for pressurizing a ripened modified clay slurry and sprinkling the slurry onto the surface of the bloomed water, and a central control system that controls the whole auxiliary device.

7 Claims, 4 Drawing Sheets

(51) Int. Cl.
  *C02F 103/00* (2006.01)
  *C02F 103/08* (2006.01)
(52) U.S. Cl.
  CPC ...... *C02F 2103/08* (2013.01); *C02F 2209/42* (2013.01); *C02F 2303/20* (2013.01)

(56) References Cited

FOREIGN PATENT DOCUMENTS

| | | | |
|---|---|---|---|
| CN | 104211151 | A | 12/2014 |
| CN | 105000648 | A | 10/2015 |
| CN | 204689689 | U | 10/2015 |
| DE | 19860568 | B4 | 8/2005 |
| KR | 101453378 | B1 * | 10/2014 |
| KR | 20150102506 | A | 9/2015 |
| KR | 101595493 | B1 | 2/2016 |

* cited by examiner

DEVICE AND METHOD FOR TREATING HARMFUL ALGAL BLOOMS USING MODIFIED CLAY

TECHNICAL FIELD

The present invention relates to the technical field of control and mitigation measures of harmful algal blooms, and particularly relates to a device and corresponding method for treating harmful algal blooms using modified clays.

BACKGROUND

Harmful algal bloom (HAB) is a common abnormal ecological phenomenon in coastal waters. The phenomenon has appeared frequently in recent years, corresponding to the intensification of climate change and human activities in the earth. HABs can seriously affect ecological safety, economic development and health of the residents, and may even kill human beings. In order to reduce the detriment of HABs, some efficient and eco-friendly countermeasures are urgently needed.

Sprinkling crude clays or modified clays to mitigate HABS is the most promising method in the world. Both domestic and international studies have discussed the algal removal efficiency of the method and its key influencing factors. Because the material attributes of modified clays have been targetedly improved, they present much better algal removal efficiencies than the crude clays. As the dose of modified clays is greatly reduced, their application has rapidly expanded in the recent years. The method is adopted and successfully used in the protection of some large water games (project) against HABs in China, such as elimination of cyanobacterial bloom in Xuanwu Lake in Nanjing during 2005 National 10th National Gaines, elimination of HAB in Qingdao Sailing Gaines adjacent waters during 2008 Beijing Olympic Gaines, elimination of HABs in Shanwei Sailing Gaines Area during 2010 Guangzhou Asian Gaines and in Daya Bay during 2011 Universiade, guarantee of clean offshore seawater in Qinhuangdao during the bloomed summer since 2012 and against blocking the waterway in the seawater cooling system in the Guangxi Fangchenggang Nuclear Power Plant during HABs occurrence since 2016.

In the HABs treatment with modified clays, a water mixture is first prepared in site by mixing the modified clay powder with some water in a ratio, and then the slurry was sprinkled onto the bloomed water surface. There is still lack of professional facilities and devices when the modified clays are used. Most practices, such as feeding powder, handling the slurry-spraying guns, usually depend on manual operation during the process. Such a kind of operation is very high in manpower requirements and low efficiency when a large area of HAB need be controlled.

Moreover, it is found that the application technology directly affects the efficiency of the modified clays to eliminate the bloomed aglae in field. For example, compared with the results tested in vitro, the field results about algal removal efficiency of the same modified clay is often far lower. By comparative analysis, it is concluded that lack of dedicated equipment obviously influences the practical efficiencies of modified clays. Although in recent years, experts have already begun to actively research and develop some related mechanical devices, the existing devices generally have the problems of low mechanization operation degree, poor integration capability, and even the influence on the efficacy of the modified clay material due to incomplete conformance with the action mechanism of modified clays removing HABs. Therefore, in order to effectively mitigate and control the HABs, and make full use of the capability to remove algae by the modified clay material, it's urgently needed of mechanized and automatic supporting tools or devices applicable to the treatment of HABs by modified clays.

SUMMARY

In view of the above problems, the purpose of the present invention is to provide a device and corresponding method for HABs treatment so as to realize mechanized operation and integration of storing, feeding, mixing and sprinkling necessary when the harmful algal blooms are mitigated and controlled using modified clays, and optimize algae removal performance of the modified clay material by controlling the mixing strength and time when the modified clay material is mixed with water and the manner of sprinkling to the bloomed water.

To achieve the above purpose, the present invention adopts the following technical solution:

A device for treating harmful algal blooms using modified clays comprises:

a power system integrated into the whole device and used to provide power required for the operation of the whole device;

a screw conveying storage bin used to store materials and convey the materials to a mixed flow system;

a mixed flow system used to continuously absorb local field water as a dispersing agent of modified clay so that an adjustable turbulence is formed when a water flow is pumped to bring about rapid mixing and ripening of the modified clay material and the water;

a high-pressure sprinkling system used to pressurize an aged modified clay slurry and sprinkle the slurry onto the surface of the bloomed water according to a program setting mode, and a central control system used to conduct central control on the whole auxiliary device.

The screw conveying storage bin comprises a storage bin and a material propeller arranged in the storage bin, wherein a streamlined bevel is presented from a side surface to a bottom center of the storage bin; the bottom is provided with at least one feeding port; the feeding port is butted against the mixed flow system; the storage bin is provided with an upper closing cover; the closing cover can move integrally or locally; the material propeller is connected with the central control system; and the central control system adjusts and controls the feeding speed of the material propeller according to a water supply flow.

The mixed flow system comprises a water supply device and a multi-cavity closed premixing tank; the multi-cavity closed premixing tank comprises a mixing tank, a reaction tank and a control tank which are successively connected in series, wherein the top of the mixing tank is provided with a feeding port communicated with the screw conveying storage bin; the control tank is provided with a control tank water outlet connected with the high-pressure sprinkling system; the water supply device is connected with the mixing tank; and the water supply device is controlled by the central control system.

An upper-layer bin and a lower-layer bin are arranged in the mixing tank; a mixing tank water inlet and a mixing tank water outlet are respectively arranged on the same side of the upper-layer bin and the lower-layer bin; a through hole communicated with the lower-layer bin is formed in the position of the bottom of the upper-layer bin away from the mixing tank water inlet; a filter screen is arranged at the through hole; the top of the upper-layer bin is provided with a vent hole and the feeding port; a static mixer a is arranged in the lower-layer bin; and the mixing tank water inlet is connected with the water supply device.

A plurality of groups of static mixers b are arranged in the reaction tank; a reaction tank water inlet and a reaction tank water outlet are respectively formed at both opposed sides of the lower end of the reaction tank; the reaction tank water inlet and the mixing tank water outlet are communicated; and the reaction tank water outlet and the control tank are communicated.

A control tank water inlet is formed near the bottom in the control tank; a control tank water outlet is formed near the upper part; a bent duct located in the control tank is arranged at the control tank water outlet; an opening of the duct extends to the bottom of the control tank; the upper end of the control tank is provided with an overflow port; a level gauge is arranged in the control tank; the level gauge is connected with the central control system; the level gauge is used to monitor a liquid level height in the control tank and send a monitoring signal to the central control system; and the central control system controls water supply speed in the mixing tank and water outlet speed of the downstream high-pressure sprinkling system according to a feedback signal of the level gauge to realize liquid level balance.

The water supply device is a water supply pump.

The high-pressure sprinkling system comprises a sprinkling pump and a spray gun, wherein the sprinkling pump is used to pressurize the uniformly-mixed modified clay slurry in the upstream control tank; the pressurized modified clay slurry is sprinkled onto the surface of the bloomed water through the spray gun; and the sprinkling pump is controlled by the central control system.

A method for treating harmful algal blooms of the above device comprises the following steps:

1) feeding: conveying the materials in the screw conveying storage bin through a screw conveyor into the mixing tank;

2) conducting preliminary mixing in the mixing tank; conveying seawater into the mixing tank through the water supply pump; mixing the seawater with the modified clay added from the upper part of the mixing tank; and conducting preliminary mixing through the static mixer a arranged on the bottom of the mixing tank in advance;

3) thoroughly mixing in the reaction tank; enabling the materials to enter the static mixer b in the reaction tank through the mixing tank; thoroughly mixing through the static mixer b; and subsequently enabling the materials to enter the control tank through the duct inside;

4) diverting and pressurizing the modified clay slurry in the control tank through the sprinkling pump, and sprinkling the modified clay slurry onto the surface of the bloomed water; and monitoring the liquid level height in the control tank through the level gauge.

The material propeller, the water supply pump, the sprinkling pump and the level gauge are connected with the central control system; and the central control system controls the charging speed of the material propeller, the water inlet flow of the water supply pump and the water outlet flow of the sprinkling pump according to the feedback signals of the water inlet flow of the water supply pump and the level gauge to realize liquid level balanced and the control of the sprinkling concentration of the modified clay.

The present invention has the following advantages and beneficial effects:

1. The present invention can bring about mechanized operation of storing and sprinkling of the modified clay material during treatment of harmful algal blooms, so that the advanced engineering operation can be satisfied when large-area harmful algal blooms are treated which can lead to high efficient engineering practice.

2. The present invention conforms to the technical principle of mitigating and controlling the harmful algal blooms using modified clays, can bring about continuous operation of storing, mixing and sprinkling of the modified clay material by providing a dedicated device. Meanwhile, the device optimizes the algae removal performance of the modified clay material by controlling the mixing strength and time of the material and water and the manner of sprinkling onto the surface of the bloomed water.

In the figures: 1 screw conveying storage bin; 2 water supply pump; 3 sprinkling pump; 4 generator; 5 reaction tank; 51 reaction tank water inlet; 52 reaction tank water outlet; 53 static mixer b; 6 mixing tank; 61 upper-layer bin; 62 feeding port I; 63 feeding port II; 64 vent hole; 65 filter screen; 66 lower-layer bin; 67 static mixer a; 68 mixing tank water inlet; 69 mixing tank water outlet; 7 control tank; 71 control tank water inlet; 72 control tank water outlet; 73 overflow port; 74 level gauge; 8 spray gun; 9 central control system; 10 screw conveyor; M feeding; N seawater; and G mixing.

DETAILED DESCRIPTION

In view of the problems of lack of dedicated devices and supporting techniques for treating harmful algal blooms in field by modified clays, the present invention provides an integrated device suitable for treatment of harmful algal blooms. The device can bring about mechanized operation of storing and sprinkling of the modified clay material during treatment of harmful algal blooms, so that not only the advanced engineering operation can be satisfied when the targeted harmful algal blooms occur in either too large area or rugged environment, but also the high removal efficiency of the modified clay material can be effectively realized in field, thereby satisfactorily solving the above problems.

To make the purpose, the technical solution and the advantages of the present invention more clear, the present invention will be described in detail below in combination with drawings and specific embodiments.

Figure 1:
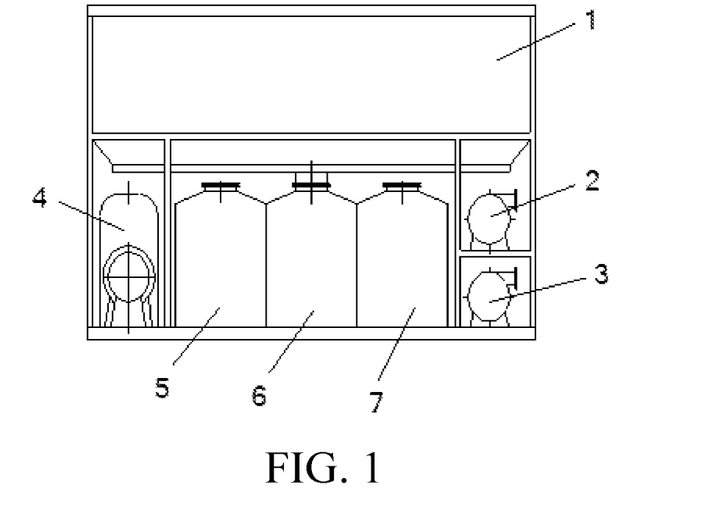
FIG. 1 is a structural schematic diagram of the present invention.
Figure 2:
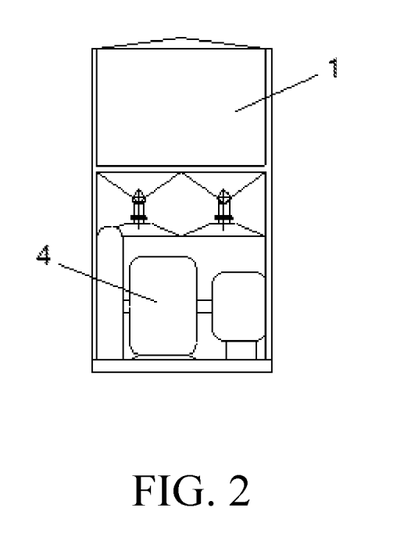
FIG. 2 is a left view of FIG. 1.

As shown in FIG. 1 to FIG. 2, the device for treating harmful algal blooms using modified clays provided by the present invention comprises:

a power system integrated into the whole device and used to provide power required for the operation of the whole device;

a screw conveying storage bin 1 used to store materials and convey the materials to a mixed flow system;

a mixed flow system used to continuously dispersing the modified clay with water which is pumped in in site and endowed an impulse so that an adjustable turbulence is formed to instantly adopt the feeded powder and then make sure the slurry uniform and ripened;

a high-pressure sprinkling system used to pressurize a ripened modified clay slurry and sprinkle the slurry onto the surface of the bloomed water according to a program setting mode; and a central control system 9 used to conduct central control on the whole auxiliary device.

The screw conveying storage bin 1 comprises a storage bin and a material propeller arranged in the storage bin, wherein the bottom of the storage bin is provided with at least one feeding port; the feeding port is butted against the mixed flow system; and the storage bin is provided with an upper closing cover. A streamlined bevel is presented from a side surface to a bottom center of the storage bin; and the upper closing cover can move integrally or locally. The material propeller is connected with the central control system 9; and the central control system 9 adjusts and controls the feeding speed of the material propeller according to the water supply speed.

In an embodiment of the present invention, the storage bin has a cross section of a U type structure and is a closed container with a certain volume and without sharp dead angle. The material propellers are two sets of screw conveyors 10 which are connected with the power system. The two sets of screw conveyors 10 are arranged on the bottom of the storage bin in advance so that the material on the bottom is traveled to the feeding port at controllable velocity. The material propellers are connected with an electronic control valve and can be subjected to programming control.

Figure 6:
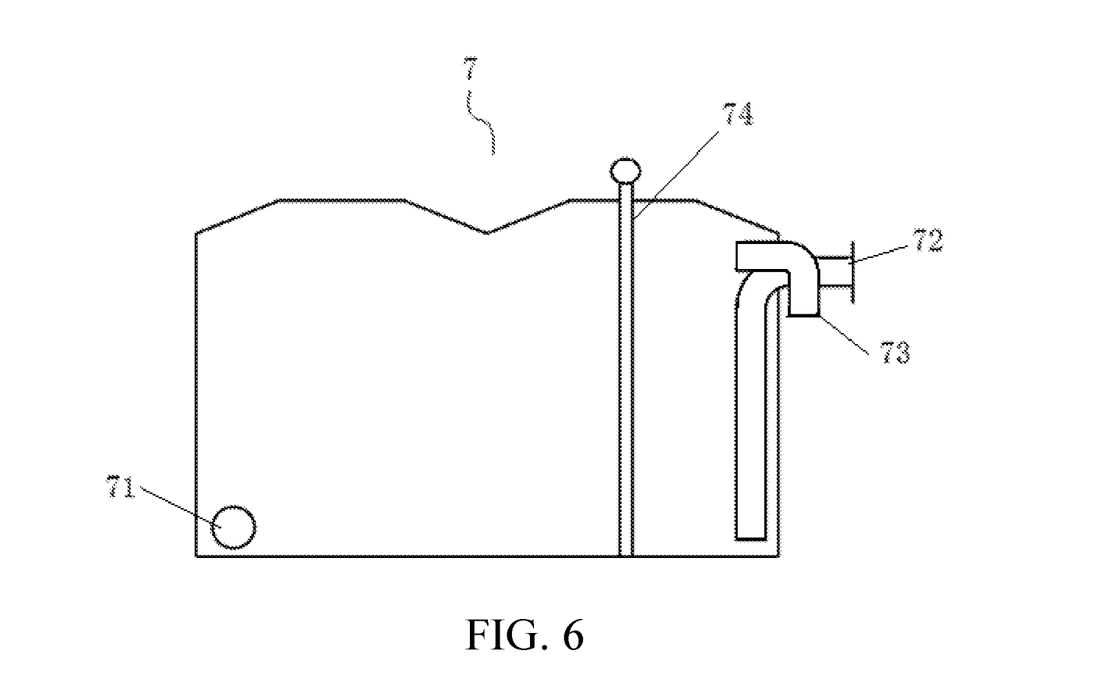
FIG. 6 is a structural schematic diagram of a control tank in the present invention.
Figure 7:
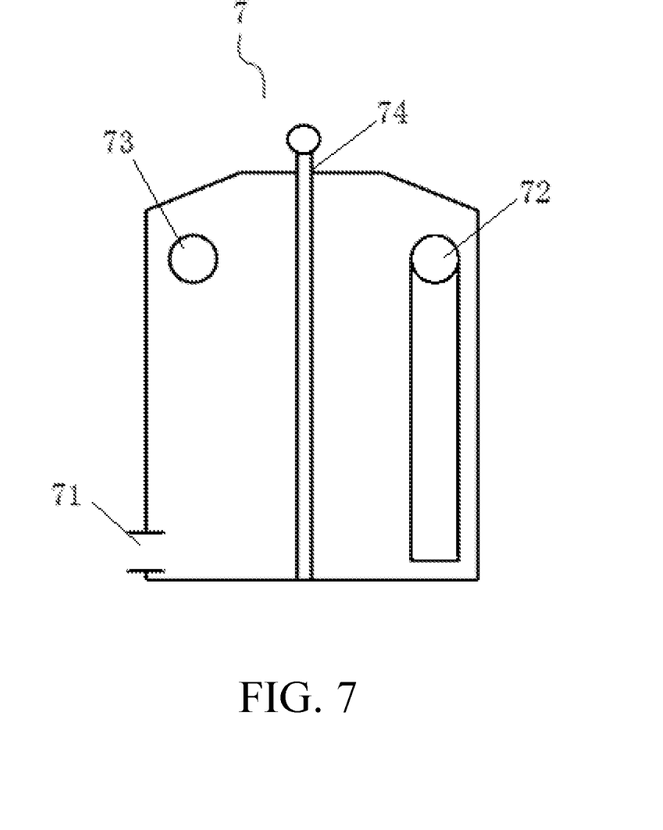
FIG. 7 is a right view of FIG. 6.

The mixed flow system comprises a water supply device and a multi-cavity closed premixing tank; the multi-cavity closed premixing tank comprises a mixing tank 6, a reaction tank 5 and a control tank 7 which are successively connected in series, wherein the top of the mixing tank 6 is provided with a feeding port communicated with the screw conveying storage bin 1; and the control tank 7 is provided with a control tank water outlet 72 connected with the high-pressure sprinkling system, as shown in FIG. 6 to FIG. 7. The water supply device is connected with the mixing tank 6. The water supply device may be a water suction pump with a different principle, wherein a submersible type water suction pump 2 is optional. The water suction pump 2 has multi-stage adjustable power and is communicated with the central control system 9. The water suction pump 2 is controlled by the central control system 9.

The multi-cavity closed premixing tank also adopts a multi-cavity embedded type composite tank to realize all the functions.

Figure 3:
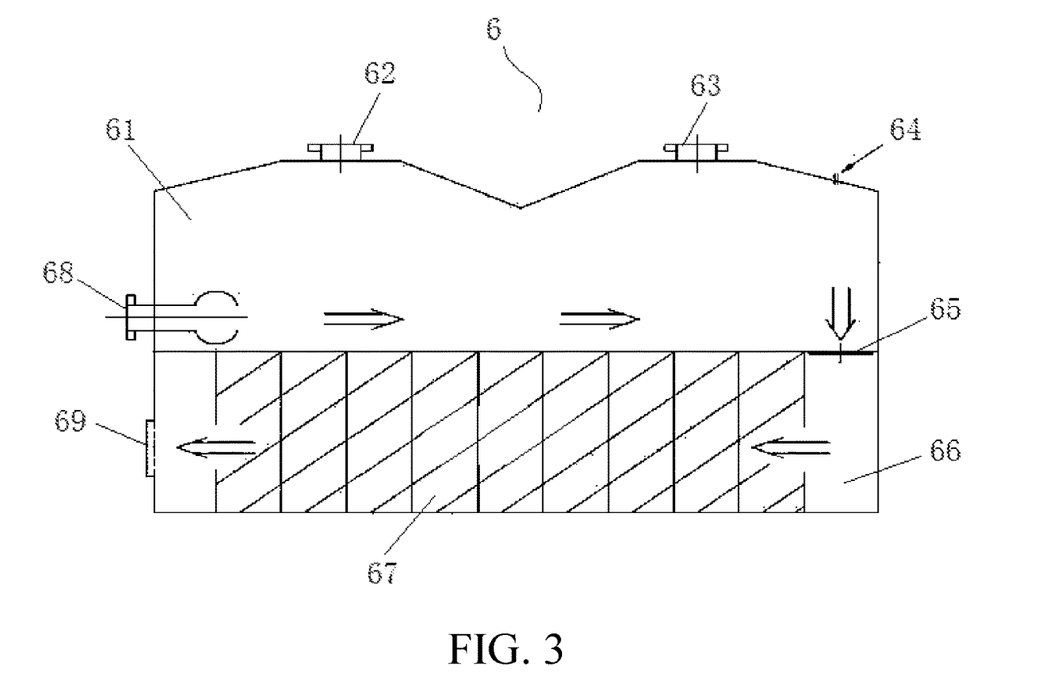
FIG. 3 is a structural schematic diagram of a mixing tank in the present invention.

As shown in FIG. 3, an upper-layer bin 61 and a lower-layer bin 66 are arranged in the mixing tank 6; a mixing tank water inlet 68 and a mixing tank water outlet 69 are respectively arranged on the same side of the upper-layer bin 61 and the lower-layer bin 66; a through hole communicated with the lower-layer bin 66 is formed in the position of the bottom of the upper-layer bin 61 away from the mixing tank water inlet 68; a filter screen 65 is arranged at the through hole; the top of the upper-layer bin 61 is provided with a vent hole 64 and the feeding port; a static mixer a 67 is arranged in the lower-layer bin 66; and the mixing tank water inlet 68 is connected with the water suction pump 2.

In an embodiment of the present invention, two feeding ports are formed in the bottom of the storage bin. The feeding port I 62 and the feeding port II 63 are formed in the top of the upper-layer bin 61. The feeding port I 62 and the feeding port II 63 are respectively communicated with the two feeding ports of the storage bin.

Figure 4:
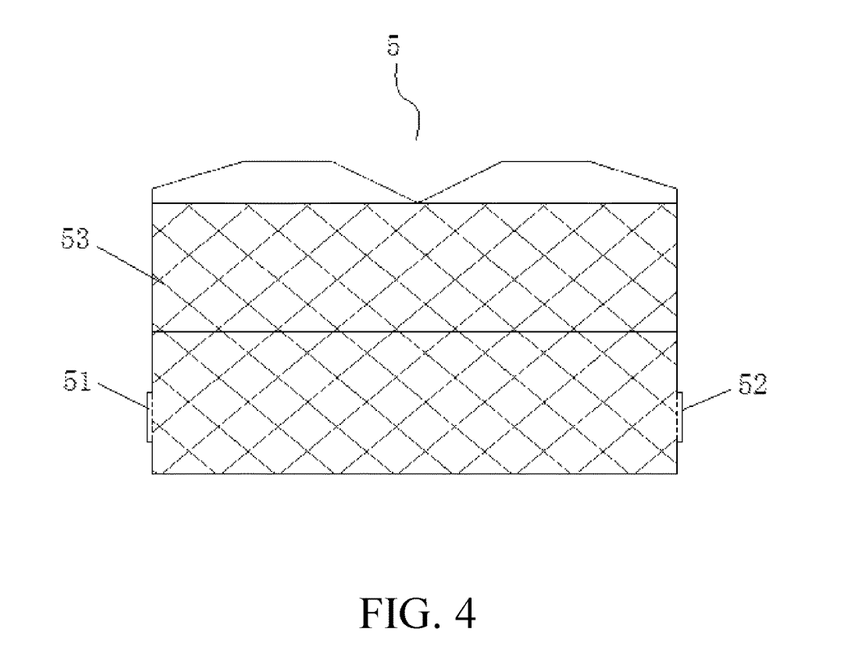
FIG. 4 is a structural schematic diagram of a reaction tank in the present invention.
Figure 5:
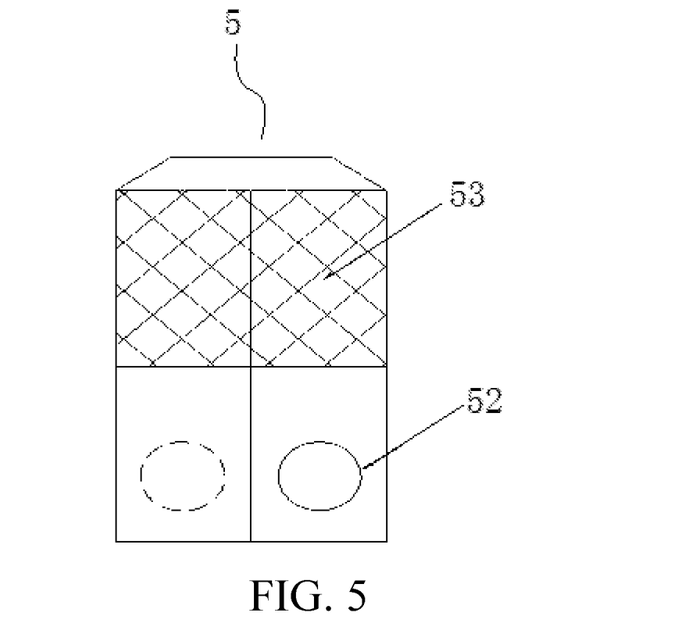
FIG. 5 is a right view of FIG. 4.

As shown in FIG. 4 to FIG. 5, a plurality of groups of static mixers b 53 are arranged in the reaction tank 5; a reaction tank water inlet 51 and a reaction tank water outlet 52 are respectively formed at both opposed sides of the lower end of the reaction tank 5; the reaction tank water inlet 51 and the mixing tank water outlet 69 are communicated; and the reaction tank water outlet 52 and the control tank 7 are communicated.

In an embodiment of the present invention, four groups of static mixers b 53 are arranged in the reaction tank 5.

As shown in FIG. 6 to FIG. 7, a control tank water inlet 71 is formed near the bottom in the control tank 7; a control tank water outlet 72 is formed near the upper part on the other side opposite to the control tank water inlet 71; a bent duct located in the control tank 7 is arranged at the control tank water outlet 72; and an opening of the duct extends to the bottom of the control tank 7. The upper end of the control tank 7 is provided with an overflow port 73; a level gauge 74 is arranged in the control tank 7; and the level gauge 74 is connected with the central control system 9. The level gauge 74 is used to monitor a liquid level height in the control tank 7 and send a monitoring signal to the central control system 9; and the central control system 9 controls water inlet speed in the mixing tank 6 and water outlet speed of the downstream high-pressure sprinkling system according to a feedback signal of the level gauge 74 to realize liquid level balance.

Figure 8:
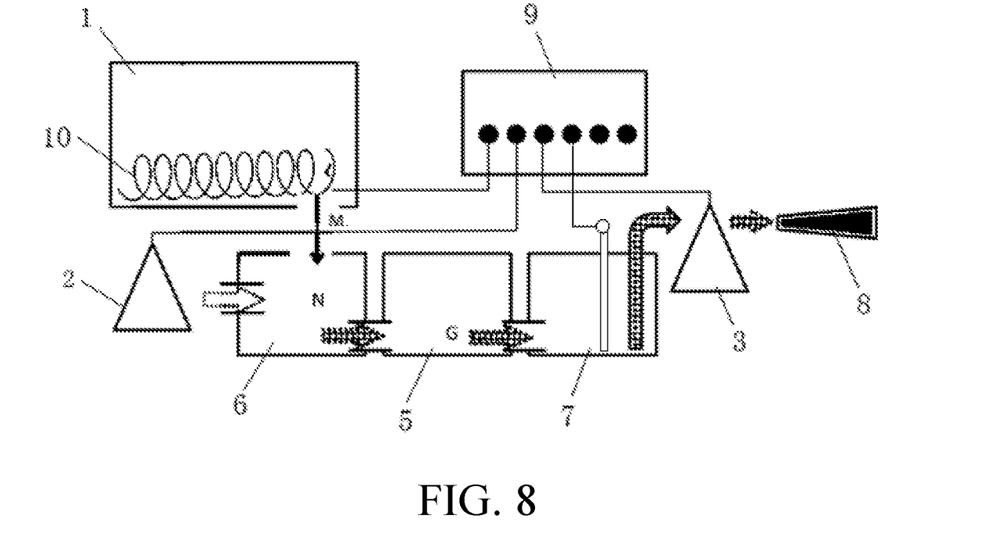
FIG. 8 is a schematic diagram of a working principle of the present invention.

As shown in FIG. 8, the high-pressure sprinkling system comprises a sprinkling pump 3 and a spray gun 8, wherein the spray gun 8 is connected with the sprinkling pump 3. The sprinkling pump 3 is used to pressurize the uniformly-mixed modified clay slurry in the upstream control tank 7; the pressurized modified clay slurry is sprinkled onto the surface of the bloomed water through the spray gun 8; and the sprinkling pump 3 is controlled by the central control system 9. The sprinkling pump 3 may be a high-pressure pump of a different principle, wherein a high-pressure slurry pump is optional.

The power system is a diesel generator or gasoline generator integrated in the whole mechanical device, and the rated output power of the power system is preferably more than twice of the operating power of the whole mechanical device.

The modified clay in the screw conveying storage bin 1 is feeded through the two sets of screw conveyors 10 from the lower feeding port to the mixing tank 6. The screw conveying storage bin 1 is a chief component of the storing and feeding system, and has the characteristics of material transporting and feeding according to the guide, controllable speed, etc. The reaction tank 5 increases the reaction time of modified clay and water, so as to increase the uniformity of the modified clay slurry. The mixing tank, the reaction tank and the control tank are chief components of the mixed flow system. The mixed flow system is used to continuously dispersing the modified clay material with water which is pumped in in site and endowed an impulse so that an adjustable turbulence is formed to instantly adopt the feeded powder and then make sure the slurry uniform and ripened. The sprinkling pump 3 is connected with the spray gun for sprinkling. A high-pressure sprinkling system is formed to pressurize the ripened modified clay slurry and sprinkle it onto the bloomed water surface according to a program setting mode. The power required is provided by a self power system (generator). All the devices and electrical appliances are uniformly controlled by the central control system 9 (control panel). The central controller is integrated by line and controlled electronically, and conducts central control on power output, water inlet and outlet quantity, water flow path, charging rate, mixing strength, pressurizing strength, field sweeping width, frequency, etc.

The device of the present invention has the operating principle that:

As shown in FIG. 8, the present invention comprises five systems. Two sets of screw conveyors 10 are arranged on the bottom of the storage bin 1 in advance. The modified clay material is pushed for feeding M into the mixing tank 6 through the feeding port arranged in advance, as a chief component of the storing and feeding system. In the mixing tank 6, the seawater N added through the water supply pump 2 from the side surface is preliminarily mixed with the modified clay added from the upper part of the mixing tank 6, i.e., preliminarily mixed through the static mixer a 67 arranged on the bottom of the mixing tank in advance, to form mixed material G Then, the mixed material G enters the static mixer b 53 in the reaction tank 5 through the duct in the mixing tank 6, is thoroughly mixed through the static mixer b 53 in the reaction tank 5, and subsequently enters the control tank 7 through the duct inside. The reaction tank 5 has the effect of strengthening the curing reaction of the modified clay in the water, so as to realize homogeneous dispersion of the modified clay slurry. The liquid level height of the modified clay slurry in the control tank 7 is monitored through the level gauge 74. Frequency regulation of the water supply pump 2 and the sprinkling pump 3 in the complete set of device is controlled according to the reaction of the level gauge 74. The water supply pump 2, the mixing tank 6 as well as the reaction tank 5 and the control 7 which are connected in series are chief components of the mixed flow system. One end of the sprinkling pump 3 is connected with the control tank 7, and the other end is connected with the spray gun for sprinkling, thereby forming the high-pressure sprinkling system. The power required is provided by a self power system (generator). All the devices and electrical appliances are uniformly controlled by the central control system 9 (control panel).

The device for treating harmful algal blooms using modified clays provided by the present invention can realize mechanized operation and integration of storing, feeding, mixing and sprinkling necessary when mitigating and controlling the harmful algal blooms using modified clays, and optimize algae removal performance of the modified clay material by controlling the mixing strength and time of the modified clay material and water and the manner of sprinkling to the bloomed water body.

A method for treating harmful algal blooms of the above device comprises the following steps:

1) feeding: conveying the materials in the screw conveying storage bin 1 through a material propeller into the mixing tank 6;

2) conducting preliminary mixing in the mixing tank 6; conveying seawater into the mixing tank 6 through the water supply pump 2; mixing the seawater with the modified clay added from the upper part of the mixing tank 6; and conducting preliminary mixing through the static mixer a 67 arranged on the bottom of the mixing tank in advance;

3) thoroughly mixing in the reaction tank 5; enabling the materials to enter the static mixer b 53 in the reaction tank 5 through the mixing tank 6; thoroughly mixing through the static mixer b 53; and subsequently enabling the materials to enter the control tank 7 through the duct inside;

4) diverting and pressurizing the modified clay slurry in the control tank 7 through the sprinkling pump, and sprinkling the modified clay slurry onto the surface of the bloomed water; and monitoring the liquid level height in the control tank 7 through the level gauge 74.

Further, the material propeller, the water supply pump 2, the sprinkling pump 3 and the level gauge 74 are connected with the central control system 9; and the central control system 9 controls the charging speed of the material propeller, the water inlet speed of the water supply pump 2 and the water outlet speed of the sprinkling pump 3 according to the feedback signals of the water inlet speed of the water supply pump 2 and the level gauge 74 to realize liquid level balanced and the control of the sprinkling concentration of the modified clay.

The present invention complies with the technical requirement for mitigating and controlling harmful algal blooms using modified clays, designs different functional units capable of realizing storage of the modified clay material, mixing with water and high-pressure sprinkling according to modules, and then conducts integration and programming control of storing, feeding, mixing and sprinkling in accordance with mechanized and integration requirements necessary for engineering operation.

For protecting waterway fluency which supplied as a cold source in Guangxi Fangchenggang Nuclear Power Plant against *Phaeocystis globosa* heavily bloomed in the close-by seawater, the above dedicated sprinkling device is designed and prepared to apply modified clays to realize requirements for automatic feeding, uniform slurry mixing, adjustable concentration, efficient sprinkling integration and full automatic operation. In field where harmful algal blooms occurred, the device is hoisted into a ship and fixed in the dock and one person operates the control panel so that sprinkling operation of the modified clay is conducted on the algae-bloomed sea area, so as to eliminate the redundant *Phaeocystis globosa* from the seawater, thereby ensuring safe operation of the seawater intake system in the Nuclear Power Plant.

The above only describes the embodiments of the present invention and is not intended to limit a protection scope of the present invention. Any modification, equivalent replacement, improvement, expansion, etc. made within a spirit and a principle of the present invention shall be contained within the protection scope of the present invention.

We claim:

1. A device for treating harmful algal blooms using modified clay, comprising:
   a power system for providing power to the device;
   a mixed flow system for continuously mixing a modified clay in water to form a modified clay slurry, wherein water is pumped from a treatment site and a turbulence of water flow is adjustable by introducing pulsations using a pump so as to facilitate a mixing between the modified clay and water;
   a screw conveying storage bin for storing and delivering the modified clay to the mixed flow system;
   a high-pressure sprinkling system for pressurizing the modified clay slurry and sprinkling the modified clay slurry onto a surface of water containing the harmful algal blooms; and
   a central control system for controlling the device, wherein the mixed flow system comprises a water supply device and a multi-cavity closed premixing tank, wherein the multi-cavity closed premixing tank comprises a mixing tank, a reaction tank, and a control tank, and wherein a top of the mixing tank is provided with a feeding port in communication with the screw conveying storage bin, the control tank is provided with a control tank water outlet connected with the high-pressure sprinkling system, the water supply device is connected with the mixing tank, and the water supply device is controlled by the central control system.

2. The device according to claim 1, wherein the screw conveying storage bin comprises a storage bin and a propeller arranged in the storage bin, wherein a streamlined bevel is presented from a side surface to a bottom center of the storage bin;

wherein the bottom of the storage bin is provided with at least one outlet, and the at least one outlet is connected to the mixed flow system;

wherein the storage bin is provided with an upper closing cover that moves integrally or locally; and wherein the propeller is connected with the central control system and the central control system adjusts and controls a speed of the propeller.

3. The device according to claim 1, wherein the mixing tank comprises an upper-layer bin and a lower-layer bin, wherein a mixing tank water inlet is disposed on the upper-layer bin and a mixing tank water outlet is disposed on the lower-layer bin;

wherein a through hole connecting the upper-layer bin and the lower-layer bin is disposed in a position on a bottom of the upper-layer bin away from the mixing tank water inlet;

wherein a filter screen is arranged at the through hole;

wherein a top of the upper-layer bin is provided with a vent hole and the feeding port;

wherein a static mixer is arranged in the lower-layer bin; and wherein the mixing tank water inlet is connected with the water supply device.

4. The device according to claim 1, wherein the reaction tank comprises a plurality of static mixers, a reaction tank water inlet and a reaction tank water outlet that are respectively formed on two opposed sides of the reaction tank; the reaction tank water inlet and the mixing tank water outlet are fluidly connected; and the reaction tank water outlet and the control tank are fluidly connected.

5. The device according to claim 1, wherein a control tank water inlet is disposed about the bottom of the control tank; a control tank water outlet is disposed about an upper part of the control tank; a bent duct located in the control tank is arranged at the control tank water outlet; an opening of the duct extends to the bottom of the control tank; the upper end of the control tank is provided with an overflow port; a level gauge is arranged in the control tank in communication with the central control system; wherein, during operation, the level gauge monitors a liquid level height in the control tank and sends a signal to the central control system; and wherein the central control system controls a water flow rate into the mixing tank and a water flow rate into the downstream high-pressure sprinkling system according to the signal from the level gauge to maintain a liquid level balance.

6. The device according to claim 1, wherein the high-pressure sprinkling system comprises a sprinkling pump and a spray gun, wherein, during operation, the sprinkling pump pressurizes the modified clay slurry from the control tank; the spray gun sprinkled the pressurized modified clay slurry onto the surface of water containing the harmful algal blooms; and the sprinkling pump is controlled by the central control system.

7. A method for treating harmful algal blooms using modified clay, comprising:

1) transferring a modified clay from a screw conveying storage bin through a screw conveyor into a mixing tank;

2) adding the modified clay into the mixing tank; adding water into the mixing tank using a water supply pump; mixing water and the modified clay using a static mixer arranged on the bottom of the mixing tank;

3) feeding the mixture of the modified clay and water from the mixing tank into a reaction tank; further thoroughly mixing the modified clay and water in the reaction tank to form a modified clay slurry; and feeding the modified clay slurry into a control tank; and 4) diverting and pressurizing the modified clay slurry from the control tank using a sprinkling pump, and sprinkling the modified clay slurry onto a surface of water containing harmful algal blooms; and monitoring a height of liquid level in the control tank through a level gauge.

* * * * *